(12) United States Patent
Ktistis

(10) Patent No.: US 11,619,758 B2
(45) Date of Patent: Apr. 4, 2023

(54) METHOD FOR OPERATING A METAL DETECTOR AND METAL DETECTOR

(71) Applicant: Mettler-Toledo Safeline Ltd., Manchester (GB)

(72) Inventor: Christos Ktistis, Warrington (GB)

(73) Assignee: METTLER-TOLEDO SAFELINE LTD., Manchester (GB)

( * ) Notice: Subject to any disclaimer, the term of this patent is extended or adjusted under 35 U.S.C. 154(b) by 347 days.

(21) Appl. No.: 16/850,489

(22) Filed: Apr. 16, 2020

(65) Prior Publication Data

US 2020/0333499 A1    Oct. 22, 2020

(30) Foreign Application Priority Data

Apr. 17, 2019    (EP) .................................... 19169830

(51) Int. Cl.
    *G01V 3/10*    (2006.01)
    *G01R 33/12*    (2006.01)
    *G01R 33/64*    (2006.01)

(52) U.S. Cl.
    CPC .................................... *G01V 3/107* (2013.01)

(58) Field of Classification Search
    CPC ......... H01F 7/064; H01F 38/14; G01R 33/12; G01R 33/066
    See application file for complete search history.

(56) References Cited

U.S. PATENT DOCUMENTS

| | | |
|---|---|---|
| 2,995,699 A | 8/1961 | Charles et al. |
| 4,070,612 A | 1/1978 | Mcneill et al. |
| 5,691,640 A | 11/1997 | King |
| 5,892,692 A | 4/1999 | Whikehart et al. |

(Continued)

FOREIGN PATENT DOCUMENTS

| | | |
|---|---|---|
| EP | 2812734 B1 | 4/2018 |
| GB | 2361544 A | 10/2001 |
| WO | 2009144461 A2 | 12/2009 |

OTHER PUBLICATIONS

Office Action dated Nov. 12, 2021, by the U.S. Patent and Trademark Office in U.S. Appl. No. 16/850,076.
Nutaq, "Digital I/Q demodulator with a high-speed ADC", https://www.nutaq.com/blog/digital-iq-demodulator-high-speed-adc, retrieved on Mar. 16, 2020, 5 pages.
Search Report dated Nov. 7, 2019, by the European Patent Office for Application No. 19169830.7.

(Continued)

*Primary Examiner* — Jermele M Hollington
*Assistant Examiner* — Temilade S Rhodes-Vivour
(74) *Attorney, Agent, or Firm* — Buchanan Ingersoll & Rooney PC

(57) ABSTRACT

A metal detector includes a balanced coil system with a transmitter coil connected to a transmitter unit, which provides a transmitter signal (s1) with at least one fixed/selectable transmitter frequency or a waveform having at least two different transmitter frequencies. First and a second receiver coils provide output signals to a receiver unit, which can include first and second phase detectors in which the output signals are compared with reference signals that correspond to the at least one transmitter frequency and are offset to each other in phase in order to produce in-phase components and quadrature components, which are forwarded to a signal processing unit to suppress signal components originating from goods or noise, and to process signal components originating from metal contaminants.

20 Claims, 7 Drawing Sheets

(56) References Cited

U.S. PATENT DOCUMENTS

| | | | | |
|---|---|---|---|---|
| 6,097,189 | A * | 8/2000 | Arndt | G01S 13/753 |
| | | | | 324/637 |
| 7,545,140 | B2 | 6/2009 | Humphreys et al. | |
| 8,587,301 | B2 | 11/2013 | Derungs | |
| 2003/0164766 | A1 | 9/2003 | Britton | |
| 2003/0184285 | A1 | 10/2003 | Anderson et al. | |
| 2005/0253711 | A1 | 11/2005 | Nelson | |
| 2007/0067123 | A1 | 3/2007 | Jungerman | |
| 2007/0188168 | A1 * | 8/2007 | Stanley | G01R 33/09 |
| | | | | 324/228 |
| 2009/0045813 | A1 | 2/2009 | Emery | |
| 2009/0318098 | A1 | 12/2009 | Stamatescu et al. | |
| 2011/0163734 | A1 | 7/2011 | Haevescher | |
| 2012/0086455 | A1 | 4/2012 | McAdam | |
| 2012/0206138 | A1 | 8/2012 | Derungs | |
| 2013/0338953 | A1 | 12/2013 | Derungs | |
| 2015/0234075 | A1 | 8/2015 | Moore et al. | |
| 2017/0097438 | A1 | 4/2017 | Reime | |
| 2017/0176364 | A1 * | 6/2017 | Lyon | G01N 27/023 |
| 2017/0338695 | A1 | 11/2017 | Port | |
| 2017/0358954 | A1 | 12/2017 | Ren | |
| 2017/0371061 | A1 * | 12/2017 | Zhao | G01V 3/08 |
| 2018/0172868 | A1 * | 6/2018 | Branson | G01V 3/15 |
| 2019/0235118 | A1 * | 8/2019 | Tao | G01V 3/107 |
| 2020/0333497 | A1 | 10/2020 | Howard | |

OTHER PUBLICATIONS

Search Report dated Oct. 17, 2019, by the European Patent Office for Application No. 19169829.9.

Search Report dated Oct. 25, 2019, by the European Patent Office for Application No. 19169834.9.

Wikipedia, "atan2", https://en.wikipedia.org/wiki/Atan2, retrieved on Mar. 19, 2020, 5 pages.

Wikipedia, "Direct digital synthesis", https://en.wikipedia.org/wiki/Direct_digital_synthesis, retrieved on Mar. 16, 2020, 3 pages.

Wikipedia, "Rotation matrix", https://en.wikipedia.org/wiki/Rotation_matrix, retrieved on Mar. 19, 2020, 16 pages.

Wikipedia, CORDIC, https://en.wikipedia.org/wiki/CORDIC, retrieved on Mar. 16, 2020, 8 pages.

Notice of Allowability dated Nov. 20, 2020, by the U.S. Patent and Trademark Office in corresponding U.S. Appl. No. 16/850,166.

Office Action (Communication) dated Jul. 25, 2022, by the European Patent Office in corresponding European Patent Application No. 20 169 251.4-1001 (12 pages).

Office Action (Final Rejection) dated Mar. 24, 2022, by the U.S. Patent and Trademark Office in U.S. Appl. No. 16/850,076.

Office Action dated Jul. 21, 2022, by the U.S. Patent and Trademark Office in U.S. Appl. No. 16/850,076.

* cited by examiner

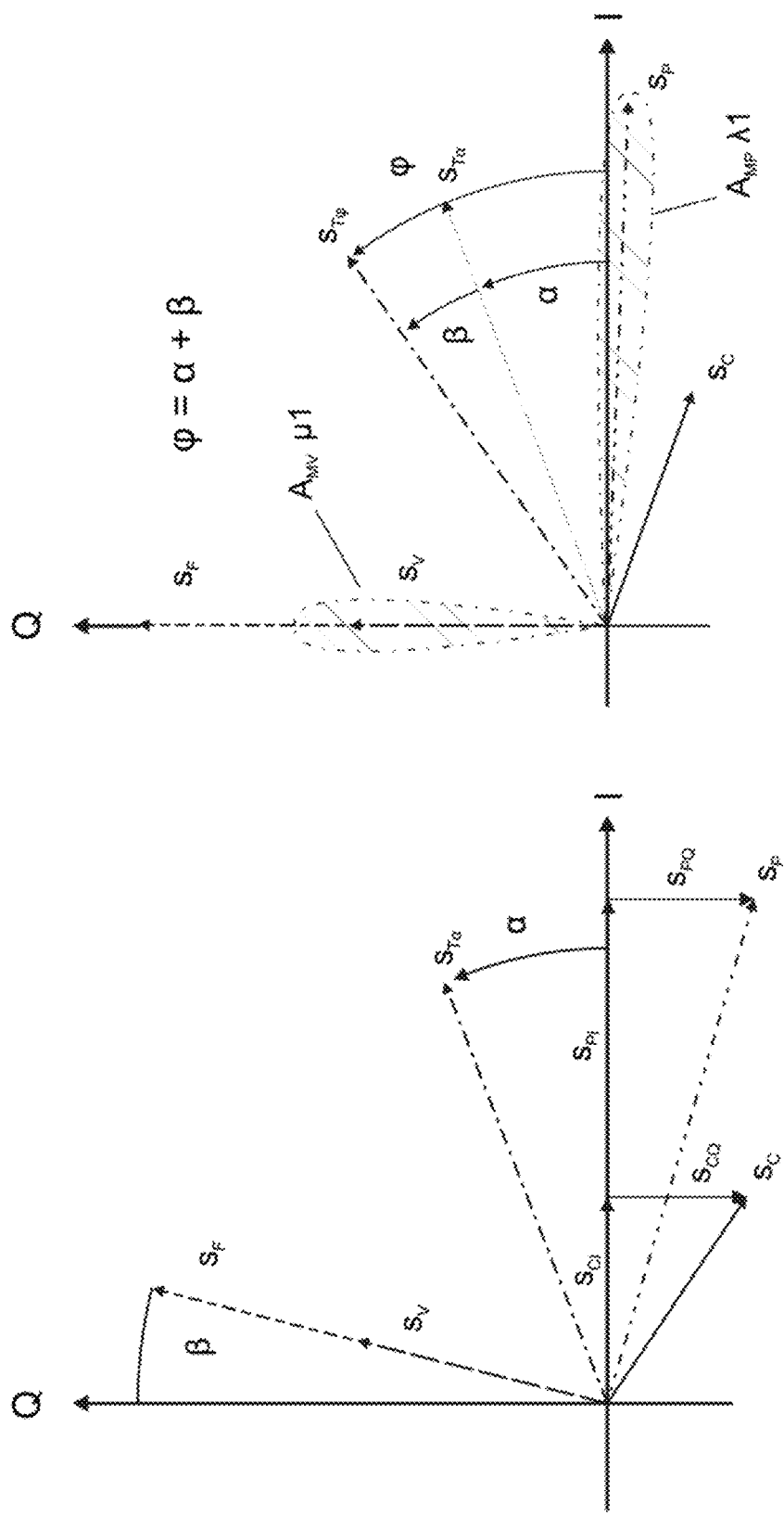

METHOD FOR OPERATING A METAL DETECTOR AND METAL DETECTOR

RELATED APPLICATION

This application claims priority under 35 U.S.C. § 119 to European Patent Application No. 19169830.7 filed in Europe on Apr. 17, 2019, the entire content of which is hereby incorporated by reference in its entirety.

FIELD

The present disclosure relates to a method for operating a metal detector that uses one or more operating frequencies, and to a metal detector operating according to this method.

BACKGROUND INFORMATION

An industrial metal detection system as disclosed for example in U.S. Pat. No. 8,587,301 B2, the disclosure of which is hereby incorporated herein by reference in its entirety, is used for detecting metal contamination in a product. When properly installed and operated, it can help reducing metal contamination and improving food safety. Most modern metal detectors utilise a search head having a "balanced coil system". Detectors of this design are capable of detecting metal contaminant types including ferrous, nonferrous and stainless steels in a large variety of products such as fresh and frozen products.

A metal detector that operates according to the "balanced coil"—principle can include three coils, a transmitter coil and two identical receiver coils that are wound onto a non-metallic frame, each parallel with the other. Since the receiver coils, which can enclose the transmitter coil centred in between, are identical, an identical voltage is induced in each of them. In order to receive an output signal that is zero when the system is in balance, the first receiver coil is connected in series with the second receiver coil having an inversed sense of winding. Hence, the voltages induced in the receiver coils that are of identical amplitude and inverse polarity cancel out one another in the event that the system is in balance and no contaminant is present in an observed product.

However, as soon as a particle of metal passes through the coil arrangement, the electromagnetic field is disturbed first near one receiver coil and then near the other receiver coil. While the particle of metal is conveyed through the receiver coils, the voltage induced in each receiver coil is changed (e.g., by nano-volts). This change in balance results in a signal at the output of the detection coils that in a receiving unit can be processed, amplified and subsequently used to detect the presence of the metal contaminant in the observed product.

In the receiver unit the input signal is normally split into an in-phase component and a quadrature component. The vector composed of these components has a magnitude and a phase angle, which is typical for the products and the contaminants that are conveyed through the coil system. In order to identify a metal contaminant, "product effects" should be removed or reduced. If the phase of the product is known then the corresponding signal vector can be reduced so that a higher sensitivity results for the detection of signals originating from metal contaminants.

Methods applied for eliminating unwanted signals from the signal spectrum exploit the fact that metal contaminants, products and other disturbances have different influences on the magnetic field so that the detected signals differ in phase. Materials with a high conductivity cause signals with a higher negative reactive signal component and a smaller resistive signal component. Materials with a high magnetic permeability cause signals with a smaller resistive signal component and a higher positive reactive signal component. Signals caused by ferrite are primarily reactive, while signals caused by stainless steel are primarily resistive. Products which are conductive can cause signals with a strong resistive component. The phase angle of the signal vectors between the resistive signal component and reactive signal component remains normally constant when a product or contaminant is conveyed through the metal detector.

Distinguishing between the phases of the signal components of different origin by means of a phase detector allows obtaining information about the product and the contaminants. A phase detector, e.g. a frequency mixer or analogue multiplier circuit, generates a voltage signal which represents the difference in phase between the signal input, such as the output signal of the receiver coils, and a reference signal provided by the transmitter unit to the receiver unit. Hence, by selecting the phase of the reference signal to coincide with the phase of the product signal component, a phase difference and a corresponding product signal is obtained at the output of the phase detector that is zero. In the event that the phase of the signal that originates from a contaminant differs from the phase of the product signal, then the product signal can be suppressed while the signal of the contaminant can be further processed. However in the event that the phase of the signal of the contaminant is close to the phase of the product signal, then the detection of contaminant fails, since the signal of the contaminants is suppressed together with the product signal. In order to separate the phase angle of a product signal from the phase angle of a contaminant, a suitable operating frequency is determined and applied.

US 2013/338953 A1, the disclosure which is incorporated herein by reference in its entirety, discloses a method for a coil based metal detector that includes a calibration module configured to determine a product-specific detection envelope or masked area, and a detection module configured to compare a vector representation of the metal detector signal to the product specific detection envelope, and to indicate a presence of a metallic contaminant in the product when the vector representation of the signal extends to an area outside the detection envelope or masked area. Hence, if the metal detector is properly calibrated, signals relating to products are suppressed by the masked area, while signals related to contaminants are detected.

US 2012/206138 A1, the disclosure which is incorporated herein by reference in its entirety, includes a method for operating a coil based metal detection system that includes steps of determining the phase and magnitude of related signals at least for a first metal contaminant for at least two transmitter frequencies and for at least two particle sizes of the first metal contaminant; determining the phase and magnitude of the related signal for a specific product for the at least two transmitter frequencies; comparing information established at least for the first metal contaminant and the information established for the product; determining a transmitter frequency with which signal components of smallest sized particles of the at least first metal contaminant differ sufficiently or most in phase and amplitude from the phase and amplitude of the product signal; and selecting this transmitter frequency for measuring the product.

WO 2009/144461 A2, the disclosure which is incorporated herein by reference in its entirety, discloses a magnetic induction tomography apparatus that includes an excitation coil arranged to emit radiation to excite a sample having at least one of an electrical conductivity distribution, an electrical permittivity distribution or a magnetic permeability distribution; and a receiver coil arranged to convert electromagnetic radiation received from the excited sample into a detection signal.

U.S. Pat. No. 4,070,612 A, the disclosure which is incorporated herein by reference in its entirety, discloses a portable apparatus that is calibrated to provide direct readings of terrain conductivity.

U.S. Pat. No. 2,995,699 A, the disclosure which is incorporated herein by reference in its entirety, discloses a geophysical survey apparatus.

US 2015/0234075 A1, the disclosure which is incorporated herein by reference in its entirety, discloses a method for compensating imbalances in the coil system and for suppressing the influence of vibrations and noise. The metal detector is calibrated to suppress signals caused by ferrite, which resemble the signals originating from noise. Consequently, by eliminating signals originating from ferrite, signals caused by vibration and noise are automatically suppressed as well. According to this method the output signal of the metal detector is measured in the presence of ferrite within the coil system and digitally adjusted so that the resistive signal component of the ferrite is eliminated.

After a metal detector has been calibrated for example according to methods already disclosed, a phasing of signals caused by contaminants, products, vibration and noise relative to phase settings according to which the metal detector is detecting contaminants and is suppressing signals originating from products and noise, is maintained. In the event of a change of the phase response of the metal detector, signals originating from products, vibration and noise can no longer be suppressed and can cause false alarms, while signals originating from contaminants are no longer detected.

SUMMARY

After a metal detector has been calibrated for example according to the method disclosed herein, a phasing of signals caused by contaminants, products, vibration and noise relative to phase settings according to which the metal detector is detecting contaminants and is suppressing signals originating from products and noise, is maintained. In the event of a change of the phase response of the metal detector signals originating from products, vibration and noise can no longer be suppressed and can cause false alarms, while signals originating from contaminants are no longer detected.A method is disclosed for operating a metal detector that includes a balanced coil system with a transmitter coil that is connected to a transmitter unit which provides a transmitter signal (s1) with at least one fixed or selectable transmitter frequency ($f_{TX}$) or a waveform having at least two different transmitter frequencies ($f_{TX}$), and with first and second receiver coils that provide output signals to a receiver unit which includes a first phase detector and a second phase detector in which the output signals are compared with related reference signals ($S_{RI}$; $S_{RQ}$) that correspond to the at least one transmitter frequency ($f_{TX}$) and are offset to each other in phase in order to produce in-phase components ($S_{3I}$) and quadrature components ($S_{3Q}$) of the output signals, which in-phase and quadrature components are forwarded to a signal processing unit that suppresses signal components originating from goods or noise and that further processes signal components originating from metal contaminants, the method comprising:

a) providing at least one test loop with a test coil that is inductively coupled with the coil system and with a controllable switch, with which the test loop is opened or closed depending on a first control signal applied to the controllable switch;

b) applying the first control signal for closing the controllable switch during a first test interval or applying the first control signal for recursively closing and opening the controllable switch according to a test frequency during the first test interval, measuring a test signal ($S_{T_\varphi}$) and determining a phase angle ($\varphi$) of the test signal ($S_{T_\varphi}$);

c) applying the first control signal for closing the controllable switch during a second test interval or applying the first control signal for recursively closing and opening the controllable switch according to a test frequency during the second test interval, measuring the test signal ($S_{T_\varphi}$) and determining a phase angle ($\varphi'$; $\varphi+\delta\varphi$) of the test signal ($S_{T_\varphi}$);

d) comparing the phase angle ($\varphi$) of the test signal ($S_{T_\varphi}$) measured in the first test interval with the phase angle ($\varphi'$; $\varphi+\delta\varphi$) of the test signal ($S_{T_\varphi}$) measured in the second test interval, and determining a related angular difference ($\delta$100 ); and e) correcting the determined angular difference ($\delta\varphi$).

A metal detector is disclosed, comprising: a balanced coil system with a transmitter coil; a transmitter unit connected with the balanced coil system and configured to provide a transmitter signal (s1) with at least one fixed or selectable transmitter frequency ($f_{TX}$), or a waveform having at least two different transmitter frequencies ($f_{TX}$); a receiver unit having an input for receiving output signals from first and second receiver coils of the balanced coil system, the receiver unit including a first phase detector (34I) and a second phase detector (34Q), in which the output signals are compared with reference signals ($S_{RI}$; $S_{RQ}$) that correspond to the transmitter frequency ($f_{TX}$) and that are offset to one another in phase in order to produce in-phase components (I) and quadrature components (Q) of the output signals; a signal processing unit for receiving the in-phase and quadrature components, and configured to suppress signal components originating from goods or noise and, and to process signal components originating from metal contaminants; at least one test loop with a test coil that is inductively coupled with the balanced coil system and with a controllable switch with which the test loop is closable depending on a first control signal (c25) that is applicable to the controllable switch; and a control unit with a control program configured with:

a) a control module by which the first control signal (c25) is applicable to the controllable switch for closing the controllable switch within a test interval or for recursively closing and opening the controllable according to a test frequency within the test interval;

b) an evaluation module by which a phase angle ($\varphi'$; $\varphi+\delta\varphi$) of the test signal ($S_{T_\varphi}$) determined in the test interval is comparable with a previously registered phase angle ($\varphi$) of the test signal ($S_{T_\varphi}$) for determining an angular difference ($\delta\varphi$); and c) a calibration module by which the determined angular difference ($\delta\varphi$) is correctable.

BRIEF DESCRPTION OF THE DRAWINGS

Detailed aspects and exemplary embodiments disclosed herein are described below with reference to the drawings, wherein:

FIG. 1 discloses an exemplary embodiment of a metal detector having a transmitter 1, a coil system 2, a receiver 3 and a signal processing unit 4 for example, integrated in a control unit 40 and a test loop 28, which can include a test coil 24 that is inductively coupled with the coil system 2, a controllable impedance 26 and a controllable switch 25, with which the test loop 28 is opened or closed for inducing a test signal $S_{T_\varphi}$;

FIG. 2a shows symbolically the signal processor 4 in an exemplary embodiment with modules 47, 48, 49 for extracting the test signal $S_{T_\varphi}$, which is caused by the application of a test frequency $f_T$ to the controllable switch 25;

FIG. 2b shows symbolically exemplary software modules of the digital signal processor 4 and control unit 40, with which controllable switches 25, 25' of a first and a second test loop 28, 28' are actuated and controllable impedances 26, 26' of the first and the second test loop 28, 28' are adjusted;

FIG. 3a shows an exemplary vector diagram taken from an uncalibrated metal detector with the signal vector $S_C$ of a contaminant, the signal vector $S_P$ of a product, the signal vector $S_F$ of ferrite, the signal vector sv resulting from vibration and noise, which is aligned with the signal vector $S_F$ of ferrite, and the signal vector $S_{T_\alpha}$ of the test loop 28;

FIG. 3b shows the vector diagram of FIG. 3a after calibration of the metal detector with all vectors rotated counter-clockwise by a calibration angle β selected to align the signal vector $S_F$ of ferrite with the reactive axis Q with the result that the phase angle of the signal vector $S_{T_\varphi}$ of the test loop 28 has changed from α to φ and with a first masked area $A_{MP}$ set at an angle λ1 for covering signals $S_P$ originating from products and with a second masked area $A_{MV}$ set at an angle μ1 for covering signals $S_V$ originating from vibrations or noise;

Figure 3D:
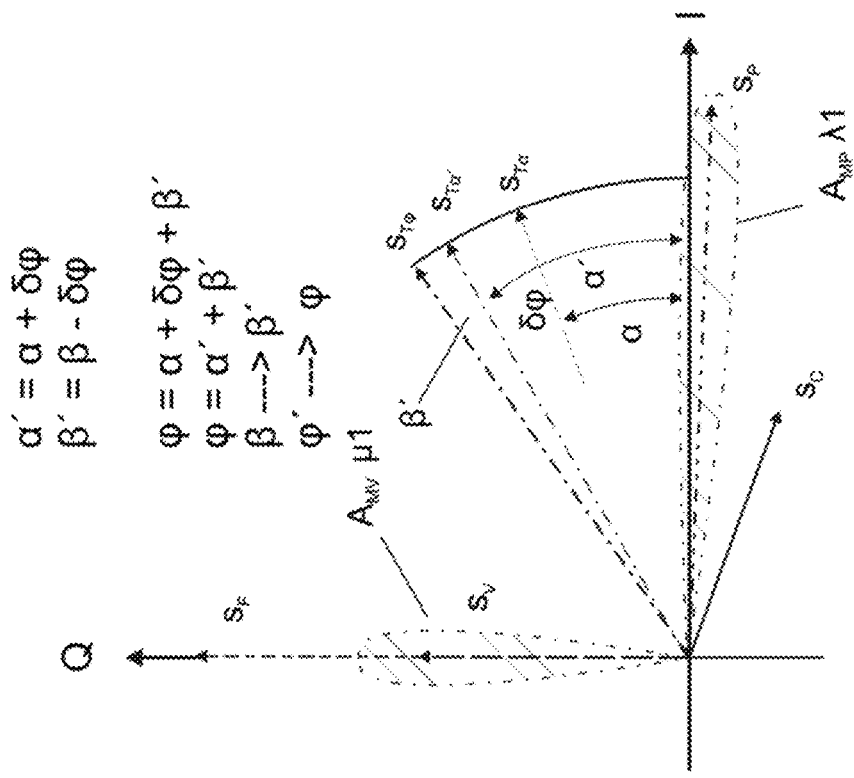
FIG. 3d shows the vector diagram of FIG. 3c after recalibrating the metal detector with the results that the phase angle of the adjusted signal vector $S_{T_\varphi}$ of the test loop 28 has been reduced by the phase angle δφ from φ' back to φ and the calibration angle has been reduced by the phase angle δφ from β to β'.
Figure 3C:
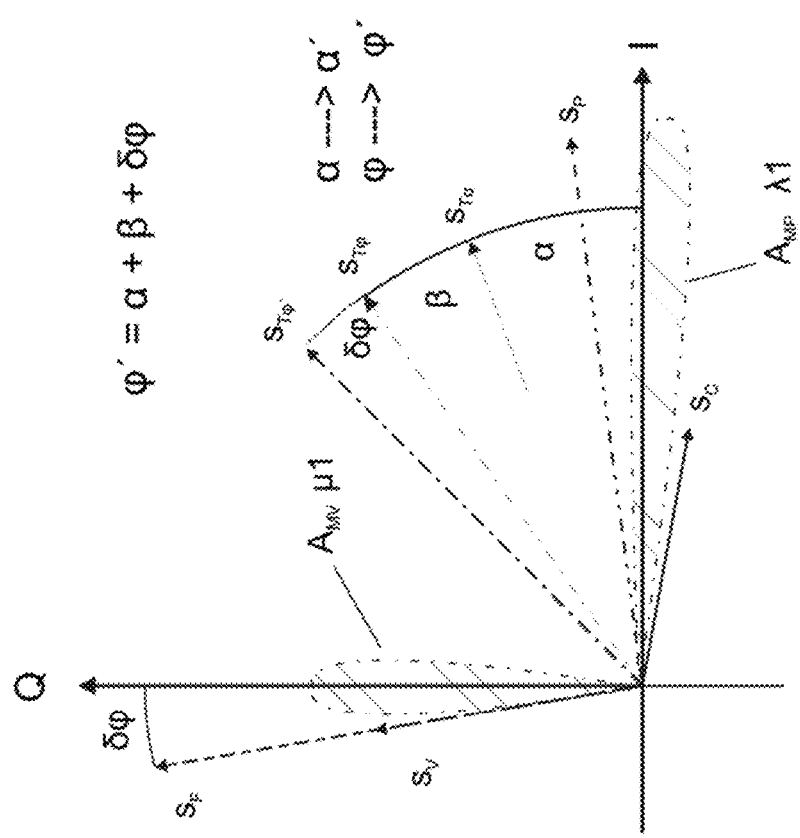
FIG. 3c shows the vector diagram of FIG. 3b after a period of operation in which a phase shift δφ has occurred with the result that the signal vector $S_V$ resulting from vibration and noise has left a masked area $A_M$ and is no longer suppressed.
Figure 3E:
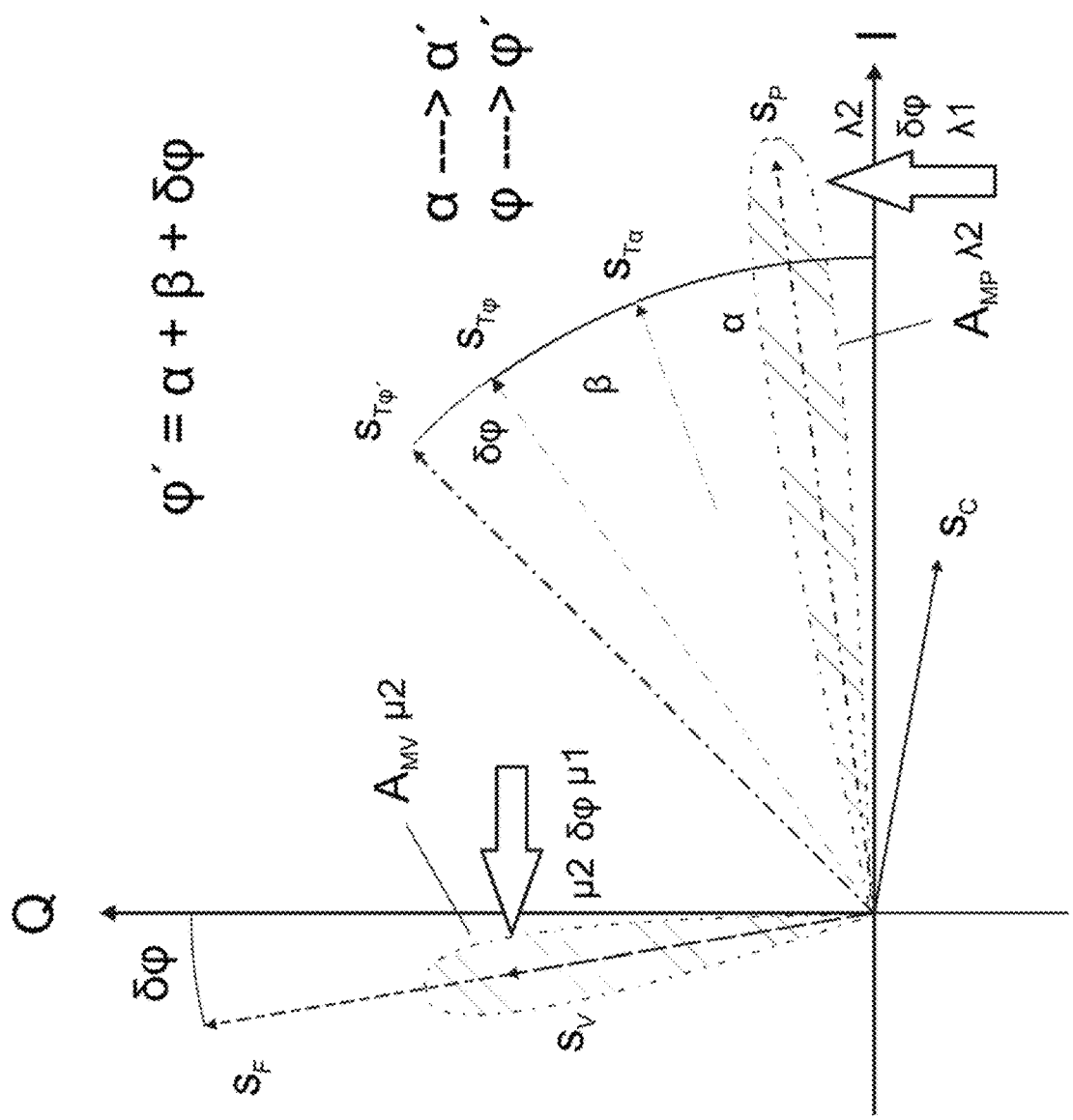
Figure 4A:
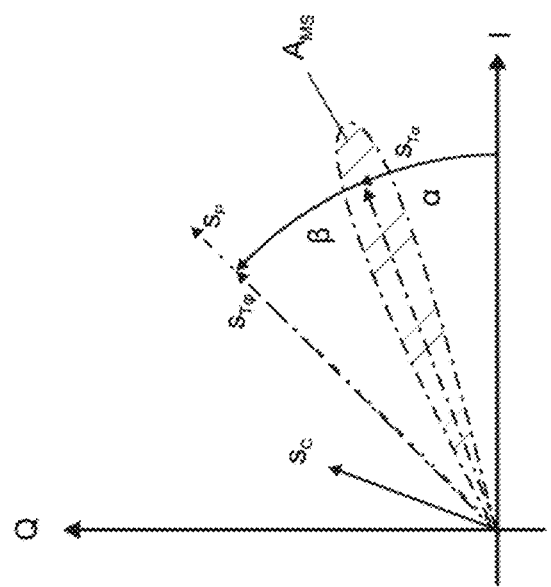
Figure 4B:
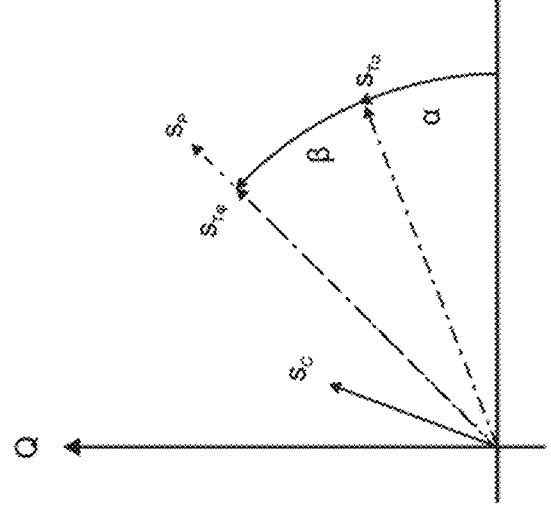
Figure 4C:
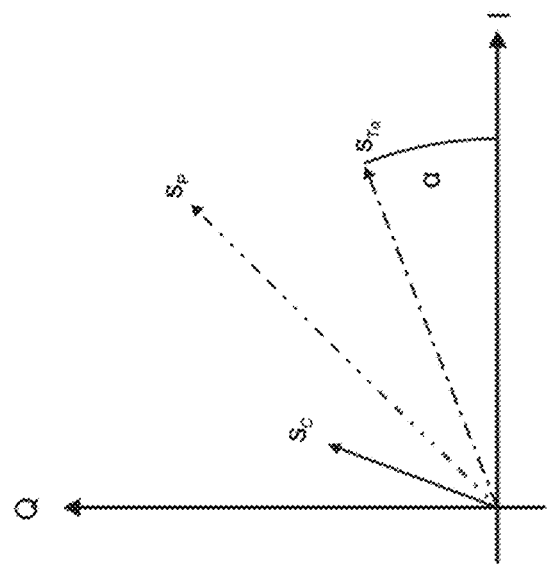

FIG. 3e shows the vector diagram of FIG. 3c after recalibrating the metal detector with the result that the phase angles of the masks or masked areas $A_{MP}$, $A_{MN}$ have been shifted by the determined phase shift δφ in order to realign the masks or masked areas $A_{MP}$, $A_{MN}$ with the signal vector $S_P$ of the product or the signal vector $S_V$ resulting from vibration and noise, respectively;

FIG. 4a shows an exemplary vector diagram taken from an uncalibrated metal detector with the signal vector $S_C$ of a contaminant, the signal vector $S_P$ of a product, and the signal vector $S_{T_\alpha}$ related to the test loop 28;

FIG. 4b shows the vector diagram of FIG. 4a with the signal vector $S_{T_\varphi}$ of the test loop 28 in alignment with the signal vector $S_P$ of the product; and FIG. 4c shows the vector diagram of FIG. 4b with the signal vector $S_{T_\varphi}$ related to the test loop 28 and the signal vector $S_P$ of the product covered by a mask or masked area $A_{MP}$.

DETAILED DESCRIPTION

The present disclosure provides an improved method for operating a metal detector that uses one or more operating frequencies, and an improved metal detector operating according to this method.

An exemplary disclosed method and the metal detector operating according to this method allow constantly maintaining optimal operating conditions in the metal detector.

The requirement and measures for correcting or recalibrating the metal detector can be ascertainable with little effort. Correction and recalibration can, for example, be executed automatically without interaction required by the user.

For example, such correction and recalibration processes can be executable during normal operation of the metal detector, while products are being inspected or within short time intervals.

Correction and recalibration can be executable without requiring the use of any test samples.

Furthermore, an exemplary disclosed method can allow testing the metal detector in order to ensure that unwanted signals are correctly suppressed.

The disclosed method can for example advantageously be implementable in metal detectors that operate with only one or a plurality of operating frequencies.

Calibration, recalibration and testing can be executable for all operating frequencies for example, automatically and with least effort.

In a first broad aspect there is provided an exemplary method for operating a metal detector, which includes a balanced coil system with a transmitter coil that is connected to a transmitter unit, which provides a transmitter signal with at least one fixed or selectable transmitter frequency or a waveform having at least two different transmitter frequencies, and with a first and a second receiver coil that provide output signals to a receiver unit, which includes a first phase detector and a second phase detector, in which the output signals are compared with related reference signals that correspond to the at least one transmitter frequency and are offset to each other in phase in order to produce in-phase components and quadrature components of the received signals, which are forwarded to a signal processing unit that suppresses signal components originating from goods or noise and that further processes signal components originating from metal contaminants.

An exemplary disclosed method can include:
a) providing at least one test loop with a test coil that is inductively coupled with the coil system and with a controllable switch, with which the test loop is opened or closed depending on a first control signal applied to the controllable switch;
b) applying the first control signal for closing the controllable switch during a test interval or applying the first control signal for recursively closing and opening the controllable switch according to a test frequency during the test interval, measuring the test signal related to the test loop and determining the phase angle of the test signal;
c) comparing the phase angle of the test signal measured in the test interval with a previously registered phase angle of the test signal and determining a related angular difference; and
d) correcting the determined angular difference.

Testing of the metal detector can therefore be done by electronically actuating the controllable switch or an analogue switch, e.g. a CMOS-switch, and measuring and analysing the related test signals for determining a phase change of the test signals. Such a phase change indicates a change of the phase response of the metal detector causing a common rotation of the individual vectors of the signal spectrum recorded. Advantageously, testing of the phase response of the metal detector can be done without entering a test sample into the coil system.

For example, during a final test the manufactured metal detector is calibrated and a test signal relating to the test loop is recorded and analysed.

At least the phase angle of the recorded test signal is stored in a database or lookup table. For example, also the signal strength or the magnitude of the vector of the test signal is recorded for later use. In the event that the phase response of the metal detector changes the phases of the signals of a recorded operating spectrum change together with the phase of the test signal. Hence, by measuring the phase of the test signal and determining an angular difference of the current phase of the test signal compared to a phase value previously recorded and stored, the change of phase response of the metal detector can exactly be determined.

After a new value of the phase of the test signal has been determined in a first test interval, the current value of the phase response of the test signal can be stored and used for a comparison with the phase of the test signal in a future test interval. Hence, the metal detector can continuously be recalibrated, to compensate for phase shifts or drifts that occur possibly due to ambient influences or relaxation processes. Phase coherence between the signal phases and the phase positions of masks or masked areas set for suppressing unwanted signals is always maintained.

An exemplary disclosed method allows determining and correcting the angular difference during normal operation of the metal detector or within test intervals when no product is present in the coil system. In exemplary embodiments, the phase response of the metal detector is continuously monitored and for example, automatically corrected.

Correction of angular difference or phase shift can be done in different ways to re-establish proper calibration of the metal detector. Thereby, it is important that signal components originating from goods or noise are again suppressed and that signal components originating from metal contaminants are detected. The angular difference by which signal vectors have been rotated in the coordinate system relative to the masked area, e.g. due to a drift of the metal detector or due to external influences, is corrected. This correction can be done in the hardware domain or in the software domain. In the hardware domain the phase of reference signals can be shifted for compensating the detected angular difference. In the software domain, can by software modules of a single processor or calibration module, the detected signals can be shifted or rotated relative to the masked areas located with specific angles in the coordinate system or the masked areas can be shifted or rotated relative to the detected signals in order to re-establish overlap of these masked areas with signals, such as signals originating from products and noise, that can be suppressed.

Correcting the determined angular difference $\delta\varphi$ means therefore returning the metal detector to a previously established calibrated state. For example, this can be done by:
changing the phase of the reference signals according to the determined angular difference, or
rotating the vectors of the recorded signal spectrum in the signal processing unit
 according to the angular difference, or
rotating masked areas set for suppressing signal components originating from goods and/or masked areas set for suppressing signal components originating from noise in phase according to the angular difference.

Since a phase shift can occur in both directions, correction of the annular difference can require shifting or rotating signal vectors and/or masked areas clockwise or counterclockwise.

However, correction of the determined angular difference or phase shift the metal detector has experienced can also be corrected in other ways, e.g. by correcting the causes of the phase shift. If anything has changed within the vicinity of the metal detector, such as the placement of metal objects or temperature settings, such changes which can have caused the phase shift can be reversed for correcting the angular difference or phase shift the metal detector shows. Hence, the correction can be done by removing the causes of the phase shift or by correcting or compensating the effect of these causes, namely compensating the determined angular difference. Such as in case that an operator uses a plurality of metal detectors, then in a first step, removing causes of a phase shift and avoiding such positive future can be preferable to pre-emptively avoid phase shifts.

In exemplary embodiments, angular differences determined are detected are automatically corrected but for example, with an indication to the operator that and to what extent such a correction has taken place. The operators can be therefore informed that phase shifts have been caused and the environment of the metal detector can be examined in view of such causes in order to avoid undesirable influences on the metal detector. Phase corrections can be displayed on a screen possibly in connection with an acoustic alarm.

A detected angular difference caused by a change of the phase response of the metal detector is corrected or compensated either in the hardware domain or in the software domain. The angular difference can be corrected in the hardware domain for example by changing the phase of the reference signals applied to the phase detectors. The reference signals are shifted in phase according to the measured angular difference of the test signals.

Alternatively the angular difference or phase deviation of the test signal is compensated in the software domain by rotating the vectors of the recorded signal spectrum in the signal processing unit according to the angular difference. Such a rotation can be performed as disclosed in https://en.wikipedia.org/wiki/Rotation matrix, the disclosure which is incorporated herein by reference in its entirety.

In the event that the controllable switch is closed for a time interval, then the test signal occurs in the recorded signal spectrum, which can be undesirable so that normal operation of the metal detector must be interrupted. The controllable switch can therefore be closed in intervals, in which no products are inspected. Since the test can be executed in a very short time interval, it is possible to use a delay in delivering products for inspection. In an exemplary embodiment, such delays are measured by detecting late arrival of the product so that such a delay can be used for a test interval.

In an exemplary embodiment an appearance of test signals in the spectrum of signals caused by products and contaminants is avoided. For this purpose the first control signal is applied to the controllable switch with a test frequency so that the test signal is offset in frequency with regards to the signals caused by products and contaminations. In the processing channels in the hardware domain or software domain the test signal is extracted from the receiver signal and is evaluated in order to determine the phase angle or the phase angle and the magnitude of the test signal.

Actuating the electronically controllable switch with a test frequency causes a modulation of the signal applied to the receiver. At any subsequent processing stage within the receiver or the signal processing unit the test signal can be removed from the carrier and the product/contaminant signals and can be evaluated in order to obtain the phase of the test signal. In an exemplary embodiment a test frequency in the range of 500 Hz to 750 Hz, or other desired range, is selected for switching the controllable switch. First the metal detector operating frequency is used for demodulating the modulated operating signal in order to shift the test signal back to the baseband for evaluation; then the test signal can be filtered from the in-phase component and quadrature component delivered by the phase detectors. These in-phase and quadrature components delivered by the phase detectors contain the signals of the signal spectrum in the baseband, and the test signal superimposed. Consequently the test signal can be regained by separating the test frequency from the baseband signals by a high pass filter or bandpass filter.

In an exemplary embodiment, the metal detector is calibrated by using a test sample, which is introduced into the coil system. Such a test sample can be a metal with a known phase angle. Calibration of the metal detector can also be done with reference to a product. Most suitable is ferrite as a test sample since the phase angle of the signals caused by ferrite is identical to the phase angle of signals caused by vibration and noise. Calibrating the metal detector by using ferrite allows therefore identifying and masking a phase region, in which vibration and noise appears.

After the phase angle of the signals relating to the test sample, e.g. ferrite, has been identified, this phase angle relating to the test sample can further be rotated by a calibration angle for example to a position, where the in-phase signal component of the test sample disappears. The test signal is rotated by the same calibration angle. The sum of the phase angle of the test sample before calibration plus the calibration angle equals therefore the new phase angle of the test sample, which is stored in a database or lookup table for later reference.

In a further exemplary embodiment, a fixed impedance is connected in series to the test coil and to the controllable switch. By selecting a corresponding impedance the phase angle of the test signal can be set to a desired value that has been determined for example in view of planned test procedures.

In exemplary embodiments, an electronically controllable impedance, which is controllable by a second control signal, is connected in series to the test coil and to the controllable switch. The controllable impedance can selectively be set to a value, in which the test signal has a desired phase angle that for example, corresponds to a test sample, such as ferrite, or to a product. The test signal with the selected phase angle can be used for calibration purposes and for testing purposes. The selectable phase angles of the test signal as can be used as reference angles for correcting or recalibrating the phase response of the metal detector. Furthermore, with the test signal set to a specific angle, e.g. to the phase angle of the product, it can be verified, whether signals of this product is correctly masked and suppressed. In a test interval a test signal is set to the phase angle of a product signal and then it is checked, whether the test signal is correctly suppressed.

In an exemplary embodiment, one test coil is connected in parallel to two or more switches, each with a fixed or controllable impedance.

In an exemplary embodiment, two or more test loops, each with a test coil that is inductively coupled with the coil system, with a controllable switch and a fixed or controllable impedance are provided, for which each a test signal is produced. The phase angles of the different test signals can be fixed or adjustable phase as disclosed herein.

An exemplary method as disclosed herein can be implemented in different embodiments of the metal detector. An exemplary metal detector can be configured and designed to generate at least one frequency, which can be selectable from a plurality of frequencies. An exemplary metal detector as disclosed herein can also be configured and designed to simultaneously generate two or more frequencies or a waveform including at least two frequencies. Any suitable waveform can be generated with a waveform oscillator or waveform generator as disclosed for example in U.S. Pat. No. 5,892,692A and in US 2007/067123A1, the disclosures which are incorporated herein by reference in their entireties.

The metal detector for example, includes a control unit with a control program with:

a) a control module configured by which the first control signal is applicable to the controllable switch for closing the controllable switch within a test interval or for recursively closing and opening the controllable switch according to a test frequency within the test interval;

b) an evaluation module configured by which the phase angle of the test signal related to the test loop determined in the test interval is comparable with a previously registered phase angle of the test signal for determining an angular difference; and c) a calibration module configured by which the determined angular difference is correctable.

In addition to the evaluation of phase changes of the test signal, changes of the magnitude of the test signals can also be evaluated and further processed. In the event that the decrease in magnitude exceeds a given threshold the requirement of maintenance of the metal detector can automatically be signalled.

Figure 1:
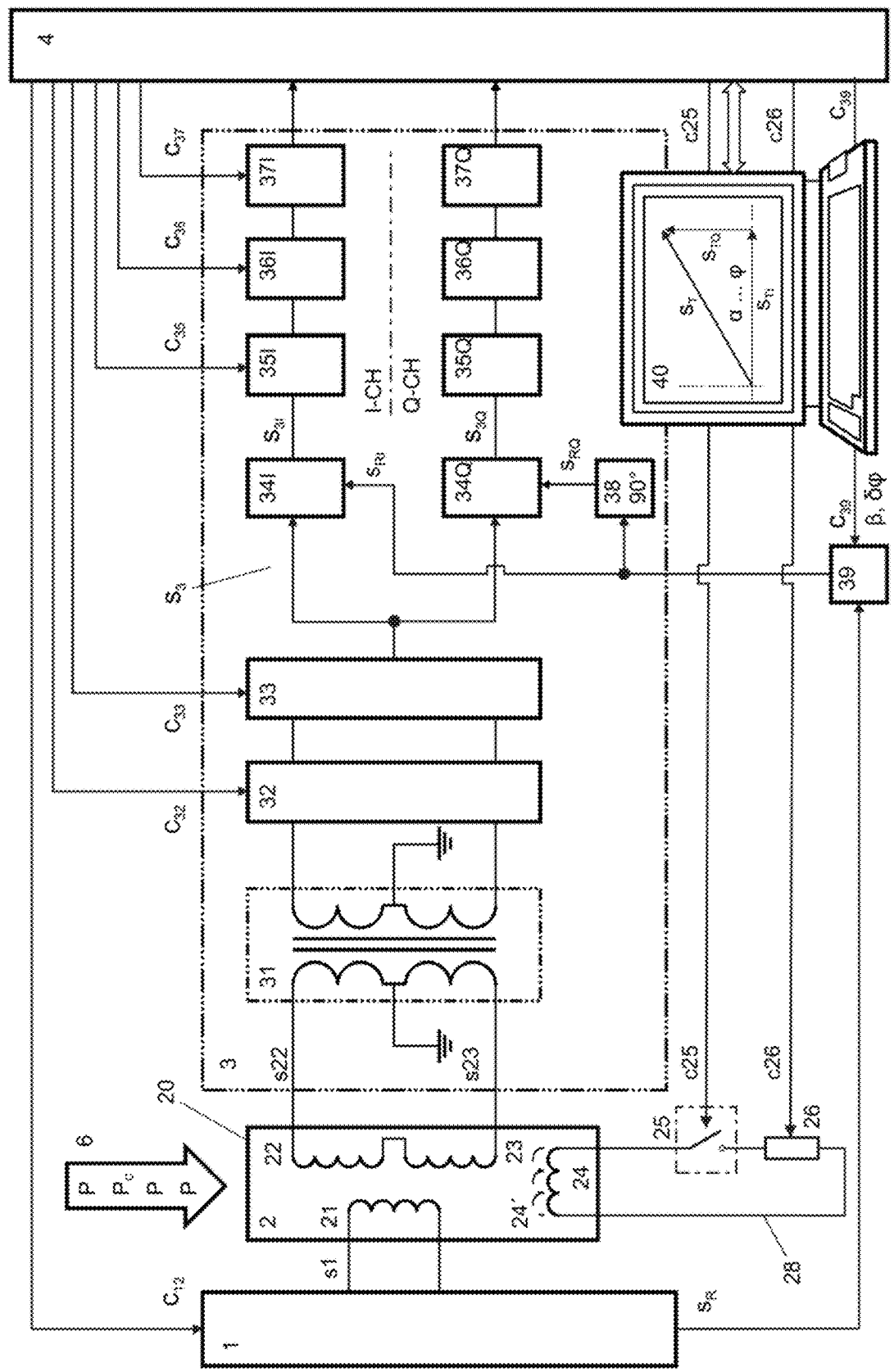

FIG. 1 shows an exemplary block diagram of a metal detector in an exemplary embodiment, which includes a transmitter unit 1, a balanced coil system 2 with a transmitter coil 21 and a first and a second receiver coil 22, 23, a receiver unit 3, a signal processing unit 4, and a control unit 40, e.g. a personal computer that includes standard interfaces, input devices and output devices, such as a display. FIG. 1 further shows a conveyor 6, on which products P are transferred through the transmitter coil 21 and the receiver coils 22, 23. Product Pc is contaminated with metal.

The transmitter unit 1 provides a transmitter signal s1 with the transmitter frequency $f_{TX}$ to the transmitter coil 21 of the balanced coil system 2 and a reference signal $S_R$ with the transmitter frequency $f_{TX}$ to the receiver unit 3. The transmitter signal s1 induces signals s22, s23 in the identical receiver coils 22, 23 that are of the same amplitude but inverse polarity as long as the system is in balance, i.e. as long as the conveyed products P are not contaminated with metal.

As soon as that the contaminated product $P_C$ passes through the balanced coil system 2, the signals s22, s23 induced in the identical receiver coils 22, 23 will change. As a result the transmitter frequency $f_{TX}$ induced in the receiver coils 22, 23 gets modulated with a base band signal, whose amplitude and frequency are dependent on the electric and magnetic property, dimension and travelling speed of the object.

In this exemplary embodiment the output signals s22, and s23 of the receiver coils 22, 23 are applied to center-tapped primary windings of a balanced transformer 31 that mirror the receiver coils 22, 23. Further, the balanced transformer 31 includes two identical center-tapped secondary windings whose opposite tails are connected to an amplifier 32. The outputs of the amplifier 32 are connected to a filter unit 33 which provides an amplified and filtered, but still modulated signal s3 to an in-phase-channel I-CH and to a quadrature channel Q-CH, which are identically designed and configured. The in-phase-channel I-CH and quadrature channel Q-CH include each a phase detector 34I; 34Q connected to a filter stage 35I; 35Q, followed by a gain stage 36I; 36Q and an analogue to digital converter 37I, 37Q.

The phase detectors 34I; 34Q, which act as demodulators, provide at their outputs the in-phase components $S_{3I}$ or quadrature components $S_{3Q}$ of the baseband signals, which originate from the conveyed products P and contaminants C.

The in-phase and quadrature signals $S_{3I}$; $S_{3Q}$ provided at the outputs of the phase detectors 34I; 34Q are forwarded via the filter units 35I; 35Q to the gain unit 36I; 36Q, which allow setting the amplitudes of the processed signals to a desired value. Subsequently the filtered and calibrated signals are converted in an analogue to digital converter 37I; 37Q from analogue signals to digital signals. Digital signals provided at the output of the analogue to digital converter 37I; 37Q are forwarded to a signal processing unit 4, such as a digital signal processor, where the signals are analysed and an alarm is raised if a signal is detected that relate to a contaminant.

Date signal processing unit 4 is for example, part of a control unit 40, e.g. a personal computer that is equipped with an operating program 49 designed for fulfilling the functions of an inventive single frequency or multi-simultaneous frequency metal detector in which the inventive method is implemented.

In this exemplary embodiment of the metal detector, the signal processor 4 is controlling the functions of various modules provided in the transmitter unit 1 and in the receiver unit 3. For this purpose, the signal processor 4 is forwarding a control signal c32 to the amplifier unit 32, a control signal c33 to the first filter unit 33, a control signal c35 to the second filter units 35I; 35Q, a control signal c36 the gain units 36I; 36Q and a control signal c37 to the analogue to digital converters 37I, 37Q. With these control signals c32, c33, c35, c36 and c37 the amplification and filter characteristics in the individual receiver units 32, 33, 35, 36 and 37 can be selected or adjusted. A further control signal c12 is forwarded to the transmitter unit 1, e.g. for selecting a suitable transmitter frequency.

From the transmitter unit 1 the reference signal sR is forwarded optionally via a controllable phase shifter 39 to the reference input of the phase detector 34I of the in-phase channel I-CH and via a fixed phase shifter 38 to the reference input of the phase detector 34Q of the quadrature channel Q-CH. Based on the supplied in-phase or quadrature reference signals $S_{RI}$, $S_{RQ}$ the phase detectors 34I, 34Q provided the in-phase components $S_{3I}$ an quadrature components $S_{3Q}$ of the baseband signals of the modulated signal s3 in the related channel 34I; 34Q.

As shown in FIG. 3a with the in-phase components $S_{CI}$, $S_{PI}$ and quadrature components $S_{CQ}$, $S_{PQ}$ of the signal of the contaminant and state signal of the product the related vectors $S_C$, $S_P$ can be drawn in a vector diagram. The transmitter frequency is selected such, that these two vectors exhibit different phase angles. In the digital signal processor 4, the signal $S_c$ relating to the contaminant is favoured, while the signal $S_P$ originating from the product is for example, discriminated or ignored.

FIG. 1 shows that the coil system 2 can include at least one test coil 24, 24', which is inductively and asymmetrically coupled with the receiver coils 22, 23 and the transmitter coil. The test coil 24 forms, together with an electronically controllable switch 25 and an electronically controllable or fixed impedance 26, which is optionally present, a test loop 28 that can be closed by the controllable switch 25. The controllable switch 25 is controlled by control signals c25 that are provided by the signal processing unit 4 or by the control unit 40. The controllable impedance 26 is controlled by control signals c26 that are provided by the signal processing unit 4 or by the control unit 40. The controllable impedance 26 is for example, set in such a way that the test signal does not saturate the receiver channels and the metal detector recovers practically without delay or that the test signal does not disturb normal operation.

Assuming that the controllable impedance 26 is not present, i.e. replaced by a short-circuit, then the test loop 28 includes (e.g., consists of) the test coil 24, which represents an inductance, the controllable switch 25 and an electrically conductive wire that represents an electrical resistance. The closed test loop 28 interacts with the coil system 2 and generates an imbalance on the receiver behaving similar to objects, such as products, contaminants or test samples that are conveyed through the metal detector. Consequently, due to the presence of a reactance and a resistance, test signals $S_T$ caused by the test loop will also exhibit a resistive component $S_{TI}$ in-phase with the transmitter signal and a reactive or quadrature component $S_{TQ}$ phase shifted by 90° relative to the transmitter signal as illustrated on the display of the control unit 40. The test signal $S_T$ shown encloses together with the resistive in-phase component $S_{TI}$ an uncorrected phase angle α or a corrected phase angle φ. The uncorrected angle α depends on the phase response of the metal detector only. The corrected angle φ depends on the phase response of the metal detector and a calibration angle β applied in addition.

The calibration angle β is applied to phase shift the signal vectors of the signal spectrum to a suitable position, in which undesirable signal components can be suppressed as disclosed below with reference to FIG. 3a and FIG. 3b.

If the test loop 28 includes (e.g., consists of) the test coil 24, the controllable switch 25 and the short-circuit wire only, then the phase angle α or φ and magnitude is dependent primarily on the inductance and resistance of the test coil 24, the phase response of the metal detector and the applied calibration angle β. In the event that the value of this angle α or φ and the magnitude are not suitable, e.g. because the magnitude is too high, causing the receiver channels to be saturated or for any other reason, a fixed impedance 26 can be added to the test loop 28 to change the value of the phase angle α or φ and magnitude accordingly. This new fixed phase angle α or φ and the magnitude can be suitable for some transmitter frequencies but can be unsuitable for other transmitter frequencies.

In order to allow selectively setting the phase angle α or φ from a fixed value to different values as required e.g. for different operating frequencies, an electronically controllable impedance 26 is added to the test loop 28. With the control signal c26 the impedance of the controllable impedance 26 can be set to a value for which a phase angle α or φ and magnitude of the test signal $S_T$ it doesn't interfere with detecting contaminants and suppressing product signals. The signal vector $S_T$ displayed on the monitor of the control unit 40 can therefore be rotated to a selectable position.

With the control signal c25 the controllable switch 25 can be closed in test intervals with a selectable length or duration e.g. of a few seconds or longer. During this test interval, the test signal $S_T$ is measured and the phase angle α or φ of the related vector is determined and stored in a database, a look-up table or any other memory unit provided for example in the control unit 40 or signal processor unit 4. The measured and determined phase angle α or φ is then compared with a previously registered phase angle of the test signal $S_T$ and a related angular difference is determined and corrected. This angular difference, which can occur after a longer period of operation, can represent a shift or drift of the phase response of the metal detector. The previously recorded phase angle of the test signal $S_T$ has for example been recorded at manufacturing site when the metal detector was calibrated or at customer site during a preceding test interval.

Alternatively, the control signal c25 can be provided with a switching frequency, with which the controllable switch 25 is opened and closed a corresponding number of times per second. With such a switching or test frequency $f_T$ the input signal at the receiver 3 is modulated accordingly. Hence, at the input of the receiver 3 an input signal $f_{TX}$ appears, which consists of the combination of two superimposed signals one from the transmitter frequency $f_{TX}$, which is modulated in amplitude by objects passing through the metal detector and the second by the transmitter frequency $f_{TX}$ which is modulated in amplitude by the test frequency of the loop 28.

The input signal $f_{TX}$ is amplified and filtered in stages 32, 33 and applied to the demodulators or phase detectors 34I, 34Q, where the input signal $f_{TX}$ is demodulated with the result that at the output of the phase detectors 34I, 34Q the in-phase and quadrature components $S_{3I}$, $S_{3Q}$ of the baseband signal related to the products or contaminants and the in-phase and quadrature components of the test signal $S_T$ appear. At this point, the test signal exhibit still the test frequency $f_T$ of 615 Hz for example.

For testing purposes the signal processor can mask or unmask the generated test signal $S_T$ by blanking out signals with a phase angle in a specific range. Alternatively the test signal $S_T$ can be suppressed by applying a filter tuned to the frequency of the test signal $S_{T_\varphi}$, e.g. to 615 Hz.

Figure 2A:
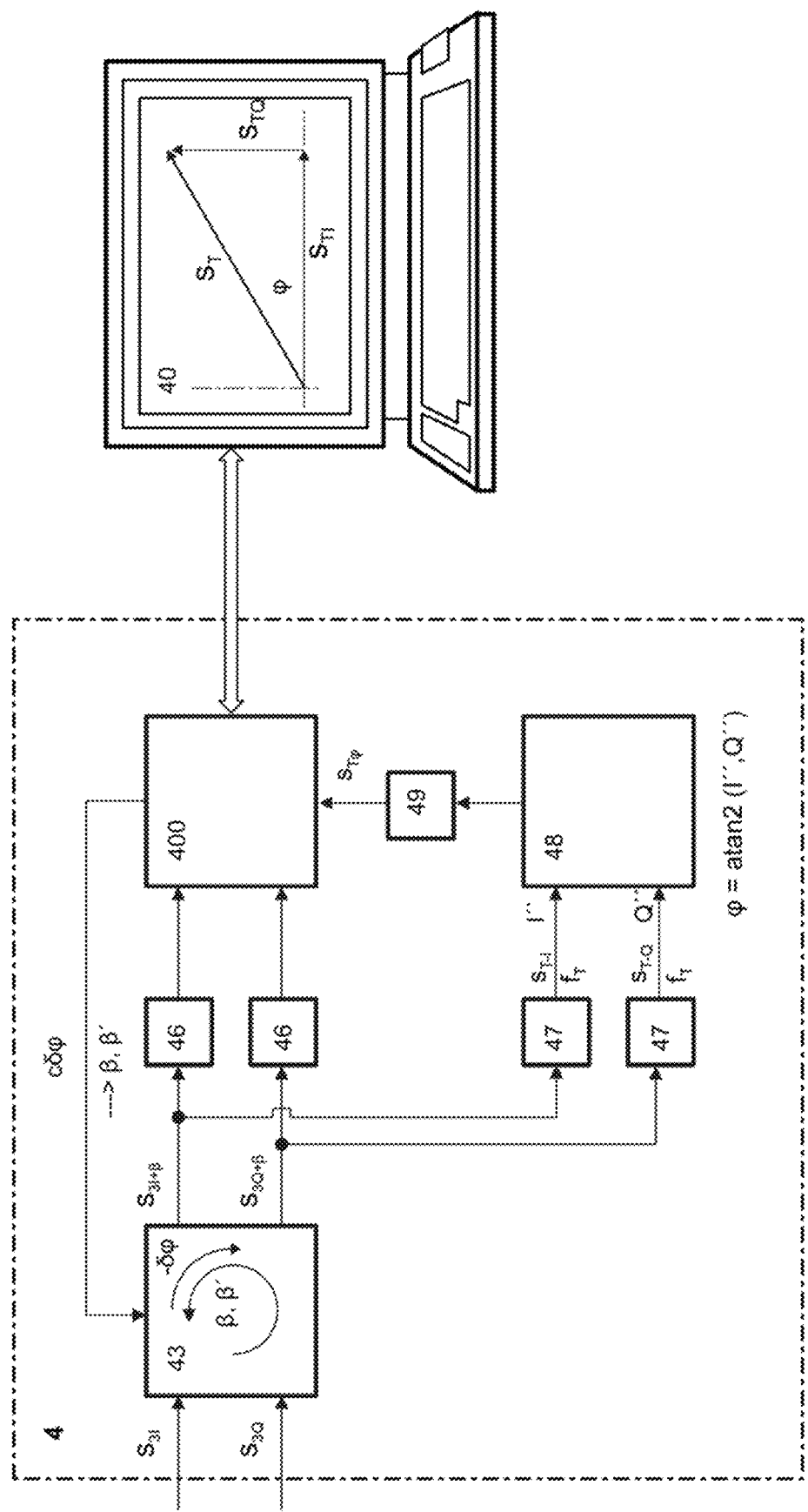

FIG. 2a shows symbolically the signal processor 4 in an exemplary embodiment with modules 47, 48, 49 for extracting the test signal $S_{T_\varphi}$, which exhibits the test frequency, from the main signal path, which leads from a calibration module 43 via low pass filters 46 to a main processing module 400. The in-phase and quadrature components $S_{3I}$, $S_{3Q}$ delivered from the receiver 3 to the calibration module 43 are phase shifted forward by the calibration angle and if present back by a determined angular difference δφ as explained in an example below with reference to FIG. 3a-FIG. 3d.

The in-phase and quadrature components $S_{3I}$, $S_{3Q}$ at the input and output of the calibration module 43 still contain the test frequency $f_T$ of the in-phase and quadrature components of the test signal $S_{TI}$, $S_{TQ}$. This test frequency $f_T$ is suppressed by the low pass filters 46 in the main signal path so that only the baseband signals of the products and contaminants are forwarded to the main processing module 400. The in-phase and quadrature components $S_{3I+\beta}$, $S_{3Q+\beta}$ of the test signal present at the output of the calibration module 43, which are blocked by the low pass filters 46, are forwarded to high-pass filters or bandpass filters 47 that are tuned to allow the in-phase and quadrature components of the test signal $S_{TI}$, $S_{TQ}$ to pass through to a phase determinator 48, in which the phase angle φ and for example, the magnitude of the test signal $S_T$ is determined.

In the phase determinator 48 for example, the arctan2-function or atan2-function is applied for obtaining the phase information for the test signal $S_T$. The arctan2-function is disclosed in https://en.wikipedia.org/wiki/Atan2, the disclosure which is incorporated herein by reference in its entirety. The output of the phase determinator 48 is forwarded via a low pass filter 49 with a cut-off frequency <1 Hz to the main processing module 400. In the main processing module 400 the determined phase angle φ' of the test signal $S_{T_\varphi}'$ is compared with a previously stored phase angle φ in order to determine the presence of an angular difference δφ. The determined angular difference δφ is reported as a correction signal cδφ back to the calibration module 43, which applies a clockwise rotation by the angle δφ to the in-phase and quadrature components $S_{3I}$, $S_{3Q}$ delivered from the receiver 3 in order to compensate the counter-clockwise angular change δφ of the phase response of the metal detector. With these corrections the phase angle φ of the test signal $S_T$ is always returned to the same value. The system acts as a control loop, which keeps the phase angle φ of the test signal $S_T$ constant. With reference to the test signal $S_T$ and the related constant phase angle φ all steps performed in the main processing module 400 for processing signals caused by products and contaminants are therefore always correctly executed. A rotation of the signal vectors of the products and contaminants relative to the applied masks is avoided. Undesirable signals, such as signals relating to products, vibration and noise are therefore always reliably suppressed.

Figure 2B:
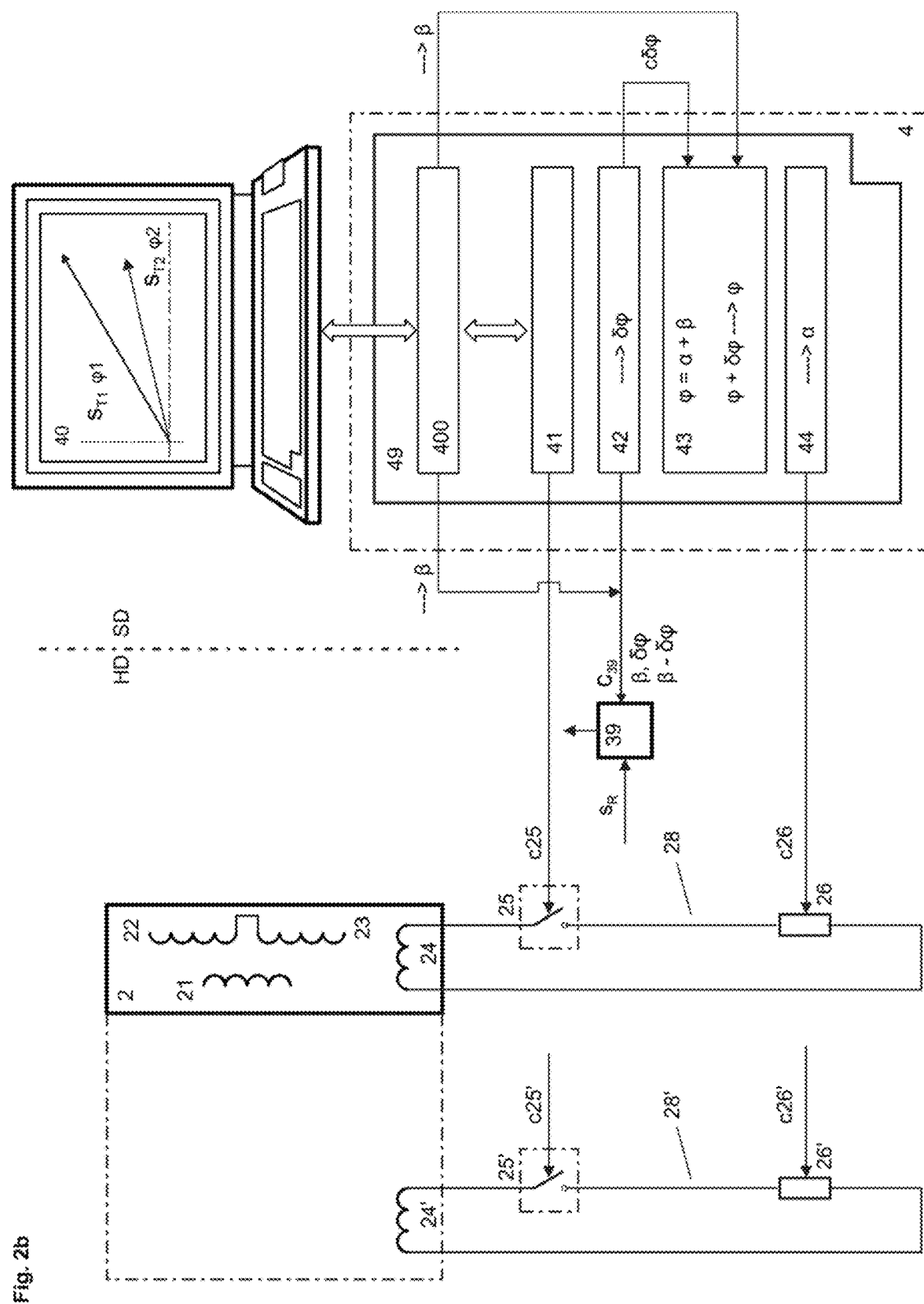

FIG. 2b shows symbolically parts of the metal detector with modules in the hardware domain HD and modules in the software domain SD. As disclosed herein, phase corrections and phase settings can either be done in the hardware domain HD or in the software domain SD. Hardware modules, controllable switches 25, 25'; controllable impedances 26, 26' and a controllable phase shifter 39 from FIG. 1 are shown in FIG. 2b. Further shown is the coil system 2 of FIG. 1 with the first test loop 28 and a further test loop 28', which can be identical to the first test loop 28, but which can include a different fixed or controllable impedance 26' and which can receive different control signals c25', c26'.

In the software domain SD the digital signal processor 4 and control unit 40 include an operation program 49 with the main processing module 400, a control module 41, an evaluation module 42, a calibration module 43, and a setup module 44. These modules 400, 41, 42, 43, 44 can interact with one another or with hardware modules, such as the controllable phase shifter 39 for executing the functions of the inventive method.

The main processing module 400 performs functions of the metal detector as disclosed in, for example in U.S. Pat. No. 8,587,301B2, the disclosure which is incorporated herein by reference in its entirety, for detecting signals of contaminants and masking and suppressing signals, e.g. product signals and signals relating to vibration and noise, that are not of interest but interfere with the measurement. The main processing module 400 can also perform functions according to the disclosed method.

The control module 41 applies the first control signal c25 to the controllable switch 25 for closing the controllable switch 25 within a test interval or for recursively closing and opening the controllable switch 25 according to a test frequency within the test interval. For this purpose, the control module 41 can activate or deactivate an oscillator, which provides the test frequency to the controllable switch 25. The controllable switch 25' of the second control 28' can be controlled with the same control signal c25 or a different control signal c25'.

The evaluation module 42 compares the determined phase angle φ' of the measured test signal $S_{T_\varphi}'$ with the phase angle of a previously registered phase angle φ of the test signal $S_{T_\varphi}$ and determines the angular difference $\delta\varphi$. The calibration module 43 is correcting the phase shift occurred in the phase response of the metal detector by applying the determined angular difference $\delta\varphi$ to the calibration module 43. Alternatively, a control signal c39 corresponding to the angular difference $\delta\varphi$ can be applied to the phase shifter 39 in order to shift the reference signals $S_{RI}$; $S_{RQ}$, which are applied to the phase detectors 34I, 34Q, accordingly. The determined angular difference $\delta\varphi$ can therefore be corrected in the hardware domain HD or in the software domain SD.

In the same way as the angular difference $\delta\varphi$ is corrected in the hardware domain HD or in the software domain SD by phase shifting the vectors of the signal spectrum according to the angular difference $\delta\varphi$, the vectors of the signal spectrum can also be shifted in phase by the calibration angle $\beta$ when the manufactured metal detector is first calibrated. A signal corresponding to the calibration angle $\beta$ can be forwarded to the calibration module 43. Alternatively a control signal c39 corresponding to the calibration angle $\beta$ can be applied to the phase shifter 39 in order to shift the reference signals $S_{RI}$; $S_{RQ}$ accordingly. For example, the difference $\beta-\delta\varphi$ of the calibration angle $\beta$ and the angular difference $\delta\varphi$ is applied to the controllable phase shifter 39 or to the calibration module 43.

With the setup module 44 the controllable impedance 26 is adjustable to a value for which test signals $S_{T_\varphi}$ with a predetermined phase angle $\varphi$ are generated. A control signal c26 is applied to the controllable impedance 26, which can consist for example of an adjustable resistor and a capacitor or an adjustable capacitor and a resistor. By adjusting the controllable impedance 26 test signals $S_T$ relating to the first test loop 28 with any desirable phase angle $\delta$ and magnitude can be generated. If present, the controllable impedance 26' of the second test loop 28' is for example, controlled by a different control signal c26', so that test signals $S_T$ with different phase angles are generated. The impedance 26' can be selected or set so that test signals $S_{T1}$, $S_{T2}$ with different phase angles $\varphi1$, $\varphi2$ are generated, as shown on the display of the control unit 40. The test loops 28, 28' could individually or simultaneously be designed, operated and activated as required. With the test signal $S_T$ a phase drift of the metal detector can be detected and corrected by applying a phase shift in opposite direction. Alternatively, a test signal $S_T$ can be generated that corresponds in phase and magnitude to a signal of a product or contaminant. It can therefore be tested, that the metal detector correctly detects such a contaminant or correctly suppresses unwanted signals.

FIG. 3a shows a vector diagram taken from an uncalibrated metal detector with the signal vector $S_C$ of a contaminant, the signal vector $S_P$ of a product, the signal vector $S_F$ of ferrite, the signal vector $S_V$ resulting from vibration and noise and the unadjusted signal vector $S_{T_\varphi}$ of the activated test loop 28. The signal vector $S_V$ resulting from vibration and noise is aligned with the signal vector $S_F$ of ferrite. For the signal vector $S_C$ of the contaminant, the signal vector $S_P$ of the product, the related in-phase and quadrature components $S_{CI}$, $S_{CQ}$; $S_{PI}$, $S_{PQ}$ are shown. Since the test loop 28 has been activated, the signal vector $S_{T_\varphi}$ is shown in the first quadrant of the vector diagram enclosing an angle $\alpha$ with the resistive axis I. The phase angle $\alpha$, which has been determined before the metal detector has been calibrated, represents the phase response of the test metal detector and the test loop 28. After calibration and rotation by calibration angle $\beta$ the signal vector $S_{T_\varphi}$ has the phase angle $\alpha$, which corresponds to the sum of the phase angles $\alpha$ and $\beta$.

By measuring and phase shifting the signal vector $S_F$ of ferrite, the signal vector $S_V$ resulting from vibration and noise can be shifted to a desired phase position, where it can easily be suppressed. Ferrite is therefore a suitable test material for calibrating the metal detector. Ferrite is a weak electrical conductor with a high magnetic permeability. For this reason the signal vector $S_F$ of ferrite located in the first quadrant of the vector diagram shows a negligible resistive component and a large reactive component. Therefore, ideally the angle $\beta$ should be zero. However, due to delays in the receiver channels, such as in the filter stage 33, and due to inaccuracies in tuning of the tuned transmitter unit 1 and the tuned receiver unit 3, the vector $S_F$ encloses a relatively small angle $\beta$ with the reactive or vertical axis of the diagram. In order to easily suppress signals resulting from vibration and noise the signal vector $S_F$ of ferrite and at the same time the signal vector $S_V$ relating to vibration and noise is phase shifted to coincide with the reactive axis Q. This in effect corrects the angle of vector $S_F$ and places it where it should be in theory. For this purpose the whole signal spectrum with all signal vectors is rotated counter-clockwise by the calibration angle $\beta$. As disclosed herein this rotation by the calibration angle $\beta$ can be done in the hardware domain or in the software domain.

FIG. 3b shows the vector diagram of FIG. 3a after calibration of the metal detector with all vectors rotated counter-clockwise by the calibration angle $\beta$, which has been selected to align the signal vector $S_F$ of ferrite with the reactive axis Q. The phase angle of the adjusted signal vector $S_{T_\varphi}$ of the closed test loop 28 has therefore changed from $\alpha$ to $\varphi$. The signal vector $S_V$ resulting from vibration and noise has been masked by a masked area $A_{MV}$ and will be suppressed during further operation of the metal detector. A further mask $A_{MP}$ has been set to cover the product signal $S_P$, which occurs during the measurement process. The test sample consisting of ferrite has been removed and will for further recalibration processes no longer be required.

FIG. 3c shows the vector diagram of FIG. 3b after a period of operation in which a phase shift $\delta\varphi$ of the phase response of the metal detector in counter-clockwise direction has occurred with the result that the signal vector $S_V$ resulting from vibration and noise and the signal vector $S_P$ of the product have left the masked areas $A_{MV}$, $A_{MP}$ and are no longer suppressed. The signal vector $S_C$ of the contaminant however has been turned towards the masked area $A_{MP}$ of the product and can get reduced. The phase angle of the signal vector $S_{T_\varphi}$ of the test signal has increased by the angular difference $\delta\varphi$ to the sum of the phase angles $\alpha$ plus $\beta$ plus $\delta\varphi$ and has changed from the phase angle $\varphi$ to the phase angle $\varphi'$. It is assumed that the phase shift $\delta\varphi$ has occurred due ageing or relaxation of components or due or due to ambient influences, such as temperature changes, which have an influence to the tuning of the metal detector.

FIG. 3d shows the vector diagram of FIG. 3b after recalibrating the metal detector. By rotating the signal spectrum in clockwise direction back by the determined angular difference $\delta\varphi$ the phase angle of the signal vector $S_{T_\varphi}$, of the test signal has a returned to the former value $\varphi$. As disclosed herein this rotation by the angular difference $\delta\varphi$ can be done in the hardware domain or in the software domain.

The signal vector $S_V$ relating to vibration and noise and the signal vector $S_P$ of the product are again masked and will be suppressed during further operation of the metal detector. The phase response of the metal detector and the test loop 28 has changed by the angular difference $\delta\varphi$ from $\alpha$ to $\alpha'$. Since phase response of the metal detector and the test loop 28 has increased by the angular difference $\delta\varphi$, the calibration angle β is reduced by the correction of the angular difference δφ to a new calibration angle β' (β→β'). The phase angle φ of the test signal $S_T$ consists therefore of the sum of the new phase response α' of the metal detector and the test loop 28 and the new calibration angle β' (φ=α'+β').

FIG. 3e shows the vector diagram of FIG. 3c after recalibrating the metal detector with the result that the phase angles of the masks or masked areas $A_{MP}$, $A_{MN}$ have been shifted by the detected phase shift δφ in order to realign the masks or masked areas $A_{MP}$, $A_{MN}$ with the signal vector $S_P$ of the product or the signal vector $S_V$ resulting from vibration and noise, respectively. The masked area $A_{MP}$ has been rotated by the correction angle δφ from a phase position λ1 to a phase position λ2, where the signal vector $S_P$ relating to products is covered again. The masked area $A_{MV}$ has been rotated by the correction angle δφ from a phase position μ1 to a phase position μ2, where the signal vector $S_V$ relating to vibration and noise is covered again. Since the masked area $A_{MP}$ has been rotated away from the signal vector $S_C$ relating to contaminants and signals relating to products, the signals $S_C$ relating to contaminants are detected after recalibration again with maximum sensitivity.

FIG. 4a shows a vector diagram taken from an uncalibrated metal detector with the signal vector $S_C$ of a contaminant, the signal vector $S_P$ of a product, and the unadjusted signal vector $S_{T_\alpha}$ related to the closed test loop 28, which together with the resistive axis I encloses an initial angle α. For calibration purposes as disclosed herein and for additional testing purposes, the signal vector $S_{T_\alpha}$ of the test loop 28 is rotated to a phase angle φ suitable for testing purposes and calibration purposes. Rotation of the signal vector $S_{T_\alpha}$ of the test loop 28 can be done by the setup module 44, which with the control signals c26 adjusts the controllable impedance 26 of the test loop 28 accordingly.

In the present example the signal vector $S_{T_\alpha}$ is rotated counter-clockwise by the angle β to a phase angle α+β, which corresponds to the phase angle of the product signal $S_P$. At this point the signal vector $S_{T_\varphi}$ of the test loop 28 and signal vector $S_P$ of the product coincide. Compared to the calibration process disclosed herein, only the signal vector $S_{T_\varphi}$ of the test loop 28 has been rotated, while the remaining signal vectors of the vector diagram remained at their positions. The inventive method allows therefore producing a test signal $S_{T_\varphi}$, at any position in the vector diagram. The rotation of the signal vector $S_{T_\varphi}$ of the test loop 28 can automatically be done by adjusting the controllable impedance 26 as disclosed herein.

After the signal vector $S_{T_\varphi}$ of the test loop 28 has been set to a desired position, tests and measurements can be executed. A drift of the phase response of the metal detector can again be measured after a longer period of operation by determining the phase angle φ' of the test signal $S_{T_\varphi}$' of and the related angular difference δφ with reference to a previously stored value φ as disclosed herein. As further disclosed herein, a phase shift that has occurred can then be corrected by applying a correction signal with the angular difference δφ as disclosed with reference to FIG. 2a and FIG. 2b. Again, the correction can be done in the hardware domain or in the software domain.

FIG. 4b shows the vector diagram of FIG. 4a with the signal vector $S_{T_\varphi}$ of the test loop 28 in alignment with the signal vector $S_P$ of the product.

FIG. 4c shows the vector diagram of FIG. 4b with the signal vector $S_{T_\varphi}$ related to the test loop 28 and the signal vector $S_P$ of the product covered by a masked area $A_{MS}$. During normal operation, the signal vector $S_P$ of the product is masked or suppressed. During the test interval, in which no products are conveyed through the metal detector, the test loop 28 can be activated by closing the controllable switch 25 for generating the test signal $S_{T_\varphi}$. The test signal $S_{T_\varphi}$ can now be used for calibration purposes and test purposes. It can be checked whether a phase shift δφ has occurred and whether the magnitude of the vector of the test signal $S_{T_\varphi}$ has changed. For this purpose, the mask $A_{MS}$ is removed or the phase of the test signal $S_{T_\varphi}$ is calculated before the mask $A_{MS}$ is applied. After correct calibration has been verified the mask $A_{MS}$ can be set back in order to mask the test signal $S_{T_\varphi}$. If any fraction of the test signal $S_{T_\varphi}$ or a part of the corresponding vector is still present, the mask can be corrected. With this procedure the test signal $S_{T_\varphi}$ can be used to test all discrimination processes executed in the metal detector. It can be verified, whether unwanted signals such as signals originating from products and vibrations, are correctly suppressed, signals originating from any sort of contaminants can correctly be detected and phase shifts can be corrected in order to automatically ensure proper function of the metal detector.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SIGNS LIST 1 transmitter unit
2 coil system
20 frame
21 transmitter coil
22, 23 receiver coil
24, 24' test coils
25 controllable switch
26 controllable impedance
28 test loop
3 receiver unit
31 balanced transformer
32 amplifier
33 filter unit
34I, 34Q phase detectors
35I, 35Q filter units
36I, 36Q gain units
37I, 37Q analogue to digital converters
38 fixed phase shifter
39 controllable phase shifter
4 digital signal processor
40 control unit
400 main processing module
41 control module
42 evaluation module
43 calibration module
44 setup module
46 low-pass filter
47 high pass filter, bandpass filter
48 phase determinator
49 low-pass filter (<1 Hz)
6 Conveyor

The invention claimed is:

1. A method for operating a metal detector that includes a balanced coil system with a transmitter coil that is connected to a transmitter unit which provides a transmitter signal (s1) with at least one fixed or selectable transmitter frequency ($f_{TX}$) or a waveform having at least two different transmitter frequencies ($f_{TX}$), and with first and second receiver coils that provide output signals to a receiver unit which includes a first phase detector and a second phase detector in which the output signals are compared with related reference signals ($S_{RI}$; $S_{RQ}$) that correspond to the at least one transmitter frequency ($f_{TX}$) and are offset to each other in phase in order to produce in-phase components ($S_{3I}$) and quadrature components ($S_{3Q}$) of the output signals, which in-phase and quadrature components are forwarded to a signal processing unit that suppresses signal components originating from goods or noise and that further processes signal components originating from metal contaminants, the method comprising:
- a) providing at least one test loop with a test coil that is inductively coupled with the coil system and with a controllable switch, with which the test loop is opened or closed depending on a first control signal applied to the controllable switch;
- b) applying the first control signal for closing the controllable switch during a first test interval or applying the first control signal for recursively closing and opening the controllable switch according to a test frequency during the first test interval, measuring a test signal ($S_{T_\varphi}$) and determining a phase angle ($\varphi$) of the test signal ($S_{T_\varphi}$);
- c) applying the first control signal for closing the controllable switch during a second test interval or applying the first control signal for recursively closing and opening the controllable switch according to a test frequency during the second test interval, measuring the test signal ($S_{T_{\varphi'}}$) and determining a phase angle ($\varphi'$; $\varphi+\delta\varphi$) of the test signal ($S_{T_{\varphi'}}$);
- d) comparing the phase angle ($\varphi$) of the test signal ($S_{T_\varphi}$) measured in the first test interval with the phase angle ($\varphi'$; $\varphi+\delta\varphi$) of the test signal ($S_{T_{\varphi'}}$) measured in the second test interval, and determining a related angular difference ($\delta\varphi$); and
- e) correcting the determined angular difference ($\delta\varphi$).

2. The method for operating a metal detector according to claim 1, comprising:
determining and correcting the angular difference ($\delta\varphi$) during normal operation of the metal detector or within test intervals when no product is present within the balanced coil system.

3. The method for operating a metal detector according to claim 1, comprising:
the angular difference ($\delta\varphi$) by at least one of:
changing a phase of the reference signals ($S_{RI}$; $S_{RQ}$) according to the angular difference ($\delta\varphi$); or
rotating vectors of a recorded signal spectrum in the signal processing unit according to the angular difference ($\delta\varphi$); or
rotating masked areas ($A_{MP}$) set for suppressing signal components ($S_P$) originating from goods, or masked areas ($A_{MV}$) set for suppressing signal components ($S_{V'}$) originating from noise in phase according to the angular difference ($\delta\varphi$).

4. The method for operating a metal detector according to claim 1, comprising:
applying the first control signal (c25) to the controllable switch with a test frequency;
separating a resulting test signal ($S_{T_\varphi}$) from a remaining spectrum of operating signals; and
determining a phase angle ($\varphi$) or a phase angle ($\varphi$) and a magnitude of the test signal ($S_{T_\varphi}$).

5. The method for operating a metal detector according to claim 1, comprising:
- a) measuring a signal ($S_F$; $S_P$) related to a test sample inserted into the coil system;
- b) determining a phase angle of the signal ($S_F$; $S_P$) related to the test sample;
- c) rotating a vector of the signal ($S_F$; $S_P$) related to the test sample by a calibration angle ($\beta$) to a position predetermined for further processing;
- d) adding a calibration angle ($\beta$) to the phase angle ($\alpha$) of the test signal ($S_{T_\alpha}$) present before calibration was executed and registering a new phase angle ($\varphi$) of the test signal ($S_{T_\varphi}$); and
- e) using a stored phase angle ($\varphi$) for comparison with a phase angle ($\varphi$) of the test signal ($S_{T_{\varphi'}}$) measured in a subsequent test interval.

6. The method for operating a metal detector according to claim 5, comprising:
using the test sample, and selecting the calibration angle ($\beta$) such that an in-phase component (I) of the signal related to the test sample is minimized.

7. The method for operating a metal detector according to claim 1, comprising:
suppressing the test signal ($S_{T_\varphi}$) by a masked area in a range of the phase angle ($\varphi$) of the test signal ($S_{T_\varphi}$), or suppressing the test signal ($S_{T_\varphi}$) by applying a filter tuned to a frequency of the test signal ($S_{T_\varphi}$).

8. The method for operating a metal detector according to claim 1, comprising:
connecting a fixed impedance in series to the test coil and to the controllable switch, or connecting a controllable impedance which is controllable by a second control signal (c26) in series to the test coil and to the controllable switch and setting the controllable impedance to a value in which the test signal ($S_{T_\varphi}$) has at least one of a desired magnitude or phase angle ($S_{T_\varphi}$) that corresponds to a test sample.

9. The method for operating a metal detector according claim 8, comprising:
setting the controllable impedance to a value in which the test loop acts as a material for which the signal processing unit is set to suppress the related signals; and
applying the first control signal (c25) for closing the controllable switch during a test interval, or applying the first control signal (c25) for recursively closing and opening the controllable switch according to a test frequency during a test interval, measuring the test signal ($S_{T_\varphi}$) and determining whether the test signal ($S_{T_\varphi}$) is suppressed.

10. The method for operating a metal detector according to claim 1, comprising:
providing an alarm when an angular difference has been detected; or
displaying an indication of the detected angular difference ($\delta\varphi$) and automatically correcting the angular difference ($\delta\varphi$).

11. The method for operating a metal detector according to claim 2, comprising:
correcting the angular difference by at least one of: ($\delta\varphi$)
changing the phase of the reference signals ($S_{RI}$; $S_{RQ}$) according to the angular difference ($\delta\varphi$), or by:
rotating vectors of a recorded signal spectrum in the signal processing unit according to the angular difference ($\delta\varphi$); or
rotating masked areas ($A_{MP}$) set for suppressing signal components ($S_{P'}$) originating from goods or masked areas ($A_{MV}$) set for suppressing signal components ($S_{V'}$) originating from noise in phase according to the angular difference ($\delta\varphi$).

12. The method for operating a metal detector according to claim 11, comprising:
applying the first control signal (c25) to the controllable switch with a test frequency;
separating a resulting test signal ($S_{T_\varphi}$) from a remaining spectrum of operating signals; and
determining a phase angle ($\varphi$) or a phase angle ($\varphi$) and a magnitude of the test signal ($S_{T_\varphi}$).

13. The method for operating a metal detector according to claim 12, comprising:
a) measuring a signal ($S_F$; $S_P$) related to a test sample inserted into the coil system;
b) determining a phase angle of the ($S_F$; $S_P$) related to the test sample by a calibration angle ($\beta$) to a position predetermined for further processing;
d) adding a calibration angle ($\beta$) to the phase angle ($\alpha$) of the test signal ($S_{T_\varphi}$) present before calibration was executed and registering a new phase angle ($\varphi$) of the test signal ($S_{T_\varphi}$); and
e) using a stored phase angle ($\varphi$) for comparison with a phase angle ($\varphi$) of the test signal ($S_{T_\varphi}$) measured in a subsequent test interval.

14. The method for operating a metal detector according to claim 13, comprising:
suppressing the test signal ($S_{T_\varphi}$) by a masked area in a range of the phase angle ($\varphi$) of the test signal ($S_{T_\varphi}$), or suppressing the test signal ($S_{T_\varphi}$) by applying a filter tuned to a frequency of the test signal ($S_{T_\varphi}$).

15. The method for operating a metal detector according to claim 14, comprising:
connecting a fixed impedance in series to the test coil and to the controllable switch, or connecting a controllable impedance which is controllable by a second control signal (c26) in series to the test coil and to the controllable switch and setting the controllable impedance to a value in which the test signal ($S_{T_\varphi}$) has at least one of a desired magnitude or phase angle ($\varphi$) that corresponds to a test sample.

16. A metal detector, comprising:
a balanced coil system with a transmitter coil;
a transmitter unit connected with the balanced coil system and configured to provide a transmitter signal (s1) with at least one fixed or selectable transmitter frequency ($f_{TX}$), or a waveform having at least two different transmitter frequencies ($f_{TX}$);
a receiver unit having an input for receiving output signals from first and second receiver coils of the balanced coil system, the receiver unit including a first phase detector (34I) and a second phase detector (34Q), in which the output signals are compared with reference signals ($S_{RI}$; $S_{RQ}$) that correspond to the transmitter frequency ($f_{TX}$) and that are offset to one another in phase in order to produce in-phase components (I) and quadrature components (Q) of the output signals;
a signal processing unit for receiving the in-phase and quadrature components, and configured to suppress signal components originating from goods or noise and, and to process signal components originating from metal contaminants;
at least one test loop with a test coil that is inductively coupled with the balanced coil system and with a controllable switch with which the test loop is closable depending on a first control signal (c25) that is applicable to the controllable switch; and
a control unit with a control program configured with:
a) a control module by which the first control signal (c25) is applicable to the controllable switch for closing the controllable switch within a test interval or for recursively closing and opening the controllable according to a test frequency within the test interval;
b) an evaluation module by which a phase angle ($\varphi'$; $\varphi+\delta\varphi$) of the test signal ($S_{T_\varphi}$) determined in the test interval is comparable with a previously registered phase angle ($\varphi$) of the test signal ($S_{T_\varphi}$) for determining an angular difference ($\delta\varphi$); and
c) a calibration module by which the determined angular difference ($\delta\varphi$) is correctable.

17. The metal detector according to claim 16, comprising:
a phase shifter that is controllable by the calibration module and by which the reference signals ($S_{RI}$; $S_{RQ}$) are shiftable in phase forth or back by a calibration angle ($\beta$) and/or by the determined angular difference ($\delta\varphi$).

18. The metal detector according to claim 16, comprising:
a software module provided in the calibration module by which the vectors of the measured operating signals are rotatable in phase forth or back by a calibration angle ($\beta$) and/or by the determined angular difference ($\delta\varphi$).

19. The metal detector according to claim 16, comprising:
a software module provided in the calibration module by which masked areas ($A_{MP}$) set for suppressing signal components ($S_{P'}$) originating from goods or masked areas ($A_{MV}$) set for suppressing signal components ($S_{V'}$) originating from noise are rotatable in phase by the determined angular difference ($\delta\varphi$).

20. The metal detector according to one of the claim 16, comprising:
a fixed impedance connected in series to the test coil and the controllable switch, or a controllable impedance is connected in series to the test coil and to the controllable switch, wherein a setup module is provided in the control unit by which the controllable impedance is adjustable to a value for which test signals ($S_{T_\varphi}$) with a predetermined magnitude and/or phase angle ($\varphi$) are generated.

* * * * *